United States Patent
Ramsey et al.

(10) Patent No.: US 10,948,599 B2
(45) Date of Patent: Mar. 16, 2021

(54) PHASING LIGHT PULSES WITH DETECTORS

(71) Applicant: Goodrich Corporation, Charlotte, NC (US)

(72) Inventors: Scott W. Ramsey, Northbridge, MA (US); Jonathan C. Jarok, Chelmsford, MA (US)

(73) Assignee: Goodrich Corporation, Charlotte, NC (US)

( * ) Notice: Subject to any disclaimer, the term of this patent is extended or adjusted under 35 U.S.C. 154(b) by 491 days.

(21) Appl. No.: 15/861,394

(22) Filed: Jan. 3, 2018

(65) Prior Publication Data
US 2019/0204445 A1  Jul. 4, 2019

(51) Int. Cl.
| G01S 17/89 | (2020.01) |
| G01S 7/486 | (2020.01) |
| G01S 7/484 | (2006.01) |
| G01S 17/10 | (2020.01) |
| G01S 17/42 | (2006.01) |
| G01S 7/4861 | (2020.01) |
| G01S 17/18 | (2020.01) |

(52) U.S. Cl.
CPC .............. *G01S 17/89* (2013.01); *G01S 7/484* (2013.01); *G01S 7/486* (2013.01); *G01S 7/4861* (2013.01); *G01S 17/10* (2013.01); *G01S 17/18* (2020.01); *G01S 17/42* (2013.01)

(58) Field of Classification Search
CPC .......... G01S 17/89; G01S 17/18; G01S 7/484; G01S 7/486; G01S 7/4861; G01S 17/10; G01S 17/42
See application file for complete search history.

(56) References Cited

U.S. PATENT DOCUMENTS

| 7,301,608 | B1* | 11/2007 | Mendenhall | ............ G01S 17/18 |
| | | | | 356/4.01 |
| 8,072,582 | B2 | 12/2011 | Meneely | |
| 8,605,261 | B2 | 12/2013 | Rindle | |
| 8,797,512 | B2 | 8/2014 | Stettner et al. | |
| 9,383,447 | B2 | 7/2016 | Schmitt et al. | |
| 9,383,753 | B1 | 7/2016 | Templeton et al. | |
| 9,641,259 | B1 | 5/2017 | Charlantini et al. | |
| 2017/0082737 | A1 | 3/2017 | Slobodyanyuk et al. | |
| 2017/0322310 | A1* | 11/2017 | Godbaz | ................ H04N 13/254 |

FOREIGN PATENT DOCUMENTS

| EP | 2887096 A1 | 6/2015 |
| JP | 2012251862 A | 12/2012 |

OTHER PUBLICATIONS

Extended European Search Report dated Jun. 3, 2019, issued during the prosecution of European Patent Application No. 19150085.9 (30 pages).

* cited by examiner

*Primary Examiner* — Luke D Ratcliffe

(74) *Attorney, Agent, or Firm* — Locke Lord LLP; Joshua L. Jones; Scott D. Wofsy

(57) ABSTRACT

A method of laser distance measurement includes issuing a command from a single controller to a laser pulse emitter to emit a laser pulse. The method includes issuing a command from the single controller to a laser pulse detector to open for detection of a return of the laser pulse. The method includes detecting a return of the laser pulse, determining total time of travel for the laser pulse, and calculating a distance measurement based on the time of travel of the laser pulse.

9 Claims, 3 Drawing Sheets

PHASING LIGHT PULSES WITH DETECTORS

BACKGROUND OF THE INVENTION

1. Field of the Invention

The present disclosure relates to laser distance finding systems, and more particularly to systems for laser range finding, for generating three dimensional point clouds such as in LIDAR/LADAR, and the like.

2. Description of Related Art

Laser distance measurement systems such as LIDAR, LADAR, and laser range finders require calibration due to the mismatch of when the laser fires and when the detector is first opened. These times can be attributed to differences in cable length, whether fiber optics or metallic wiring are used, charge delay times, optical output differences, and the like. An additional problem with laser distance systems is that stray or random light may be detected before the laser light. This is more likely the further the object is from the sensor due to the increased time the detection gate is open. Therefore, traditional systems are bound to a maximum measurable distance.

The conventional techniques have been considered satisfactory for their intended purpose. However, there is an ever present need for improved imaging systems. This disclosure provides a solution for this need.

SUMMARY OF THE INVENTION

An imaging system includes a laser pulse emitter and a laser pulse detector. A single controller is connected to the laser pulse emitter and to the laser pulse detector to control timing of a laser pulse emitted from the laser pulse emitter and corresponding timing of opening the laser pulse detector for detection of a return of the laser pulse.

The single controller can include a field programmable gate array (FPGA). A scanner can be optically connected to the laser pulse emitter for scanning laser pulses over a field of regard. A scanner can be optically connected to the laser pulse detector for detecting laser pulse returns from the field of regard. It is also contemplated that optics can be optically connected to the laser pulse emitter for emitting the laser pulse as a conical flash over a field of regard, and at least one of optics or a scanner can be optically connected to the laser pulse detector for detecting laser pulse returns from the field of regard. The system can include machine readable instructions configured to cause the controller to perform any of the methods disclosed herein.

A method of laser distance measurement includes issuing a command from a single controller to a laser pulse emitter to emit a laser pulse. The method includes issuing a command from the single controller to a laser pulse detector to open for detection of a return of the laser pulse. The method includes detecting the return of the laser pulse, determining total time of travel for the laser pulse, and calculating a distance measurement based on the time of travel of the laser pulse.

The controller can tune timing of emitting the laser pulse from the laser emitter to match a window of time in which the detector is open for detection of the laser pulse. The controller can delay issuing the command to open the laser pulse detector relative to when the laser pulse is emitted from the laser pulse emitter. The controller can command the laser pulse emitter to emit multiple laser pulses, and the controller can issue corresponding commands to open the laser pulse detector for detection of the respective pulses each with a respective window of laser pulse detection. The respective window for each laser pulse can vary in duration over the multiple laser pulses. The controller can vary duration of the respective window of laser pulse detection on a pulse by pulse basis. The controller can command the laser pulse detector to open for multiple windows for a single pulse of the laser pulse emitter for measuring multiple ranges with a single laser pulse. The controller can command the laser pulse detector to open for laser pulse detection for a window with a shorter duration than time of flight for the laser pulse. The method can include controlling at least one of pulse duration and/or duration of window of opening the laser pulse detector to limit distance measurements to specific distances.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
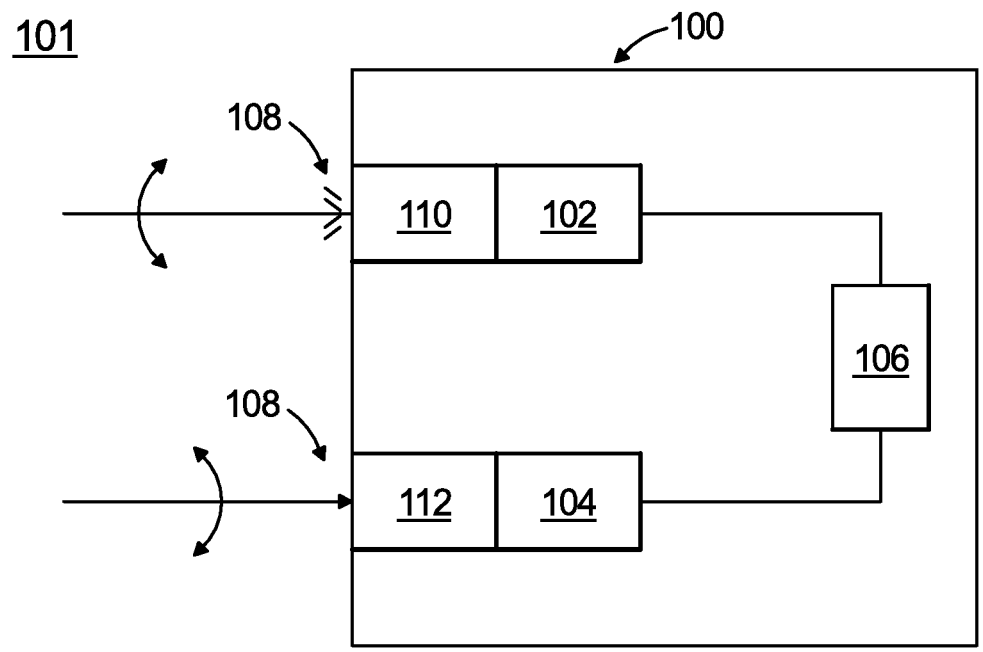
FIG. 1 is a schematic view of an exemplary embodiment of a system constructed in accordance with the present disclosure, showing the single controller, the laser pulse emitter, and the laser pulse detector.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used for laser range measurements such as used in LIDAR/LADAR point cloud generation, laser range finders, and the like.

Figure 2:
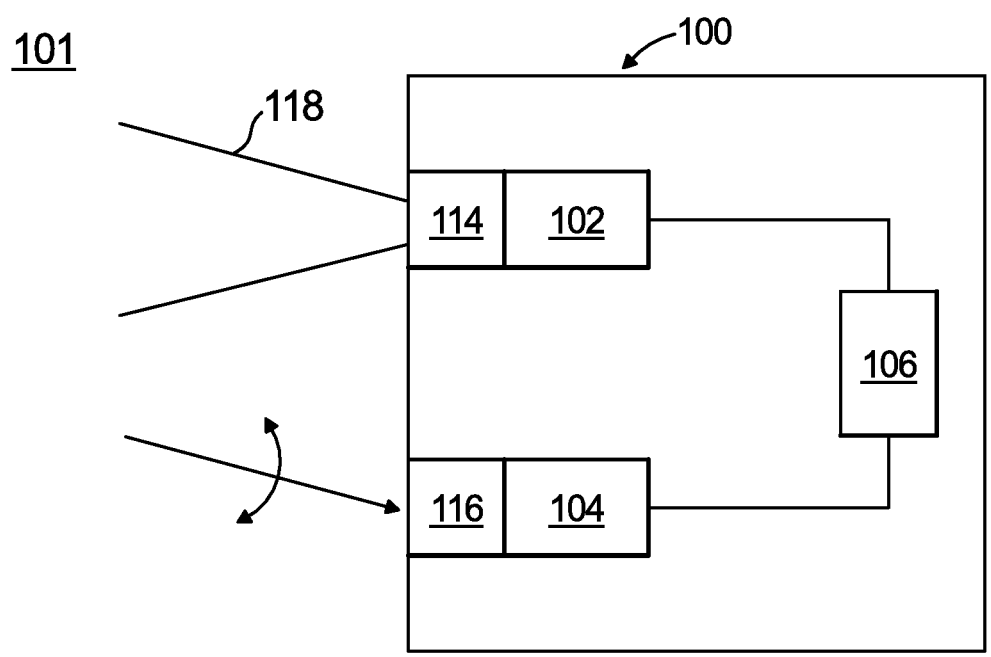
FIG. 2 is a schematic view of the system of FIG. 1, showing a flash LIDAR configuration for the laser pulse emitter and laser pulse detector.

Imaging system 100 includes a laser pulse emitter 102 and a laser pulse detector 104. A single controller 106, such as single field programmable gate array (FPGA) is connected to the laser pulse emitter 102 and to the laser pulse detector 104 to control timing of a laser pulse 108 emitted from the laser pulse emitter 102 to a scene 101 and corresponding timing of opening the laser pulse detector 104 for detection of a return of the laser pulse 108 returning from the scene. A scanner 110 is optically connected to the laser pulse emitter for scanning laser pulses over a field of regard, schematically indicated by the double arrows in FIG. 1. A scanner 112 is optically connected to the laser pulse detector 104 for detecting laser pulse returns from the field of regard, also indicated by the double arrows in FIG. 1. As shown in FIG. 2, It is also contemplated that optics 114 can be optically connected to the laser pulse emitter 102 for emitting the laser pulse as a conical flash 118 over a field of regard in lieu of the scanner 112, and at least one of optics 116 or a scanner 112 can be optically connected to the laser pulse detector 104 for detecting laser pulse returns 118 or 108 from the field of regard. The system 100 can include machine readable instructions, e.g., stored in controller 106, or stored elsewhere in system 100 and communicated to controller 106, wherein the instructions are configured to cause the controller 106 to perform any of the methods disclosed herein. The laser pulse emitter 102 and the laser pulse detector 104 are not slaved to one another, but are independently controlled by the single controller 106.

Figure 3:
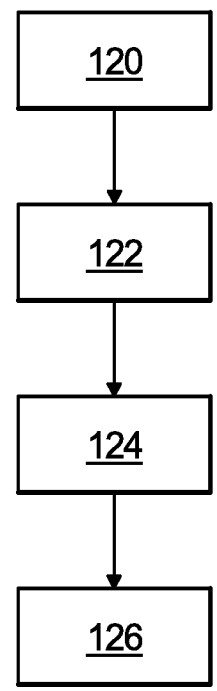
FIG. 3 is a flow diagram showing a portion of a method in accordance with the present disclosure.

A method of laser distance measurement includes issuing a command from a single controller, e.g., controller 106, to a laser pulse emitter, e.g., laser pulse emitter 102, to emit a laser pulse. The method includes issuing a command from the single controller to a laser pulse detector, e.g., laser pulse detector, to open for detection of a return of the laser pulse. As shown in FIG. 3, the method includes detecting the return of the laser pulse 120, determining total time of travel 122 for the laser pulse, and calculating a distance measurement based on the time of travel of the laser pulse 124. The method can also include outputting the distance measurement, e.g., as a distance value in a laser range finder, or as part of a point in a point cloud for a LIDAR/LADAR system.

Figure 4:
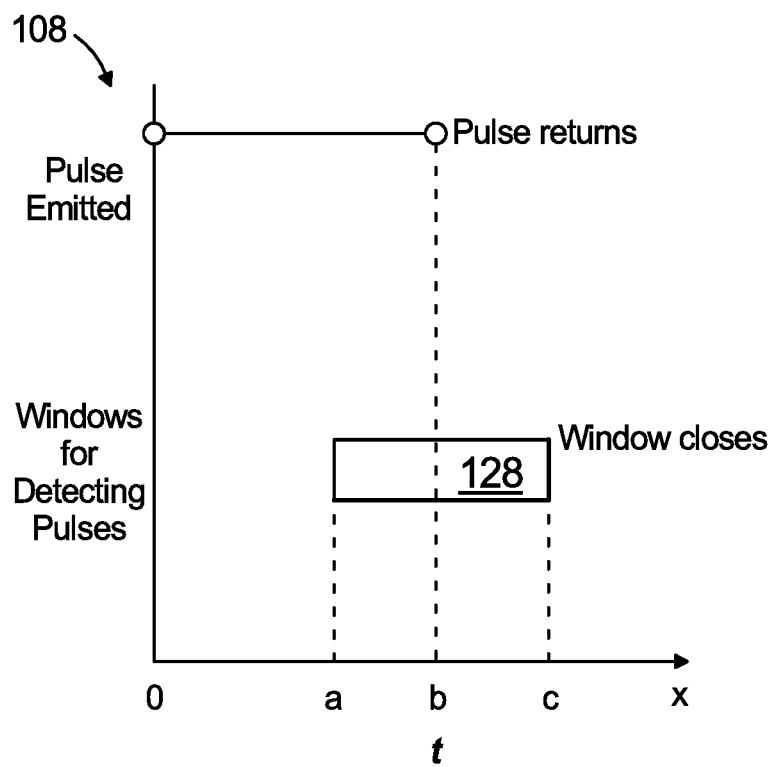
FIG. 4 is a timing diagram for an exemplary embodiment of a method in accordance with the present disclosure, showing timing of the pulse emitted and detector window for detecting a single return from a single pulse.
Figure 5:
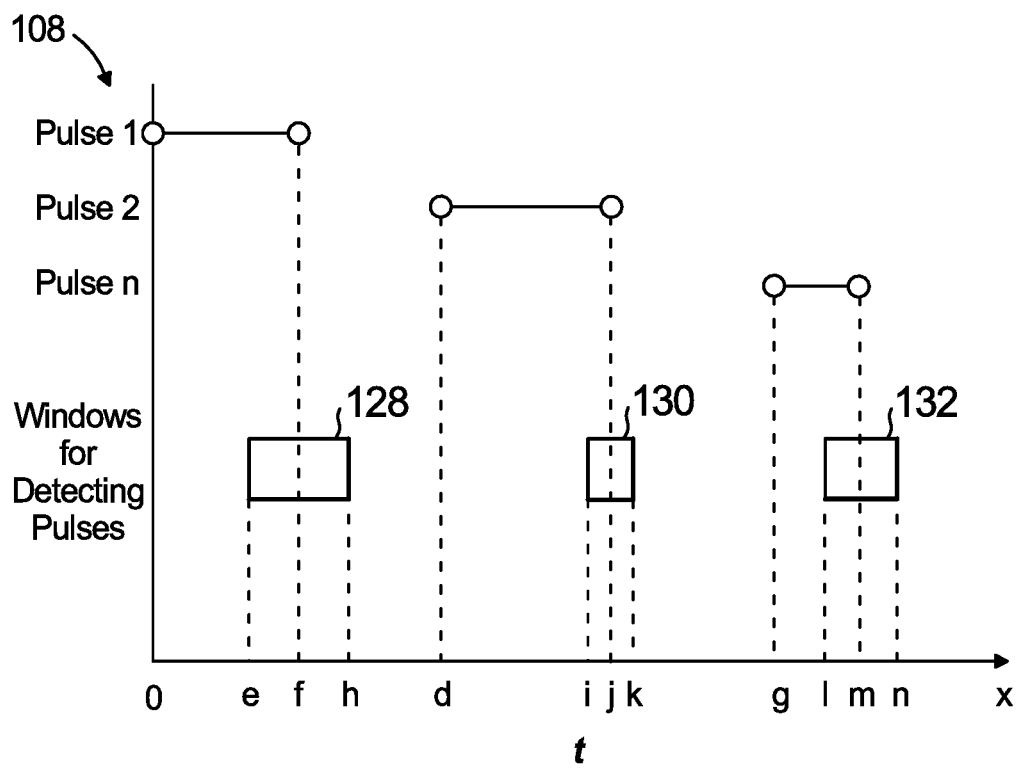
FIG. 5 is a timing diagram for an exemplary embodiment of a method in accordance with the present disclosure, showing timing of multiple pulses and windows, wherein there is one respective window of each pulse.
Figure 6:
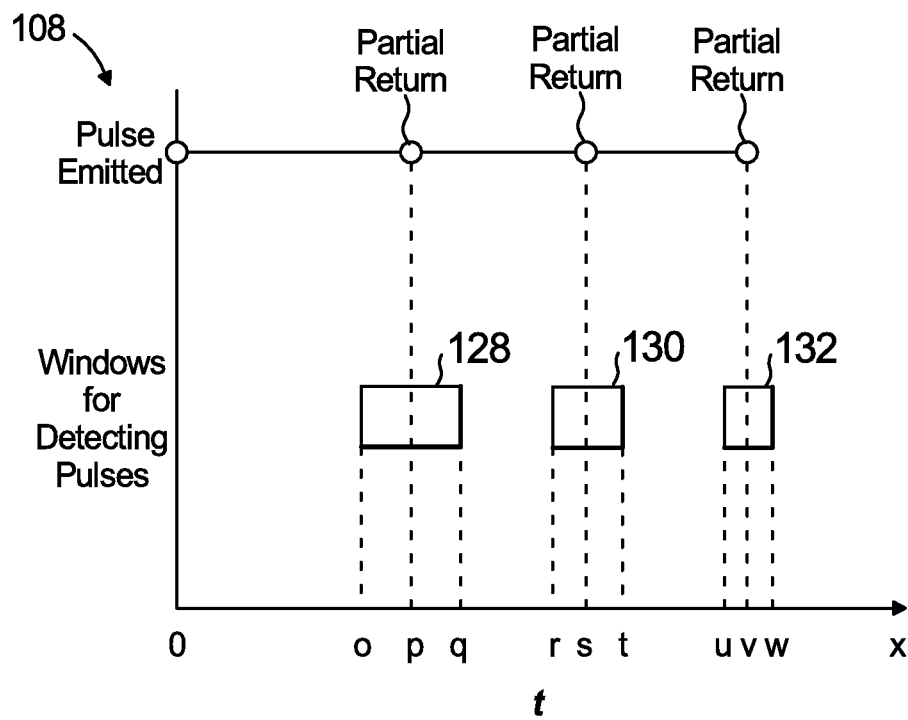
FIG. 6 is a timing diagram for an exemplary embodiment of a method in accordance with the present disclosure, showing timing of a single pulse emitted with multiple returns and multiple windows for detecting the returns.

In FIGS. 4-6, the horizontal axis represents time t, and various events are spread over the vertical axis of each figure to show exemplary methods of using system 100. With reference now to FIG. 4, the controller 106 tunes the timing of emitting the laser pulse 108 from the laser emitter 102 to match a window of time 128 in which the laser pulse detector 104 is open for detection of the laser pulse 108. The controller 106 delays issuing the command to open the laser pulse detector 104, by an amount of time a, relative to when the laser pulse 108 is emitted from the laser pulse emitter 102. The controller 106 commands the laser pulse detector 104 to open for laser pulse detection for a window 128 that has a shorter duration, e.g., c-a, than time of flight b for the laser pulse 106. Having a narrow, delayed gate for the window 128 relative to traditional systems allows for reduced stray photons triggering false returns. Reduced false returns allows for improved signal to noise ratio, and extended range.

In another example, shown in FIG. 5, the controller 106 commands the laser pulse emitter 120 to emit multiple laser pulses 108, one at time zero, one at time d, and one at time g. The controller 106 issues corresponding commands to open the laser pulse detector 104 for detection of the respective pulses each with a respective window 128, 130, and 132 of laser pulse detection. The first window 128 starts at time e and ends at time h to capture a return of the first pulse at time f. The second window 130 starts at time i and ends at time k to capture a return of the second pulse at time j. The third window 132 starts at a time l and ends at time n to capture a return of the third pulse at time m. The respective window for each laser pulse can vary in duration over the multiple laser pulses, e.g., on a pulse by pulse basis. Those skilled in the art will readily appreciate that any suitable number of windows and pulses can be used without departing from the scope of this disclosure.

In another example shown in FIG. 6, the controller 106 commands the laser pulse detector 104 to open for multiple windows 128, 130, and 132 for a single pulse 108 of the laser pulse emitter 102 for measuring multiple ranges with a single laser pulse. There are multiple, partial returns from the single pulse 108, one for each of the respective windows 128, 130, and 132. The first window 128 starts at time o and ends at time q, to capture a return at time p. The second window 130 starts at time r and ends at time t to capture a return at time s. The third window 132 starts at a time u and ends at time w to capture a return at time v. Those skilled in the art will readily appreciate that any suitable number of windows and returns can be used without departing from the scope of this disclosure. This configuration can allow each window to represent a different distance window. The higher the repetition rate of opening and closing windows, the more ranges can be measured. This allows for multiple distance measurements with a single laser pulse, and can eliminate the issues in traditional systems of being bound to fixed distances. This also reduces the traditional problem of stray light being detected, which increases the longer the gate or window is open. This technique can be used with either a scanning LIDAR system, as shown in FIG. 1, or a flash LIDAR system, as shown in FIG. 2. This also allows for more distance measurements with less laser energy. Controlling pulse duration and/or duration of window of opening the laser pulse detector can allow limiting distance measurements to specific distances, e.g., to measure distance only objects within a predetermined distance range from system 100.

Systems and methods as disclosed herein provide advantages over traditional techniques, potentially including the following advantages. Calibration issues in traditional systems can be reduced or eliminated. The maximum range and signal on laser distance measurements can be increased over that of traditional systems. Complex triggering systems as in traditional LIDAR/LADAR systems can be eliminated. Calibration can be used to generate a precise distance measurement, with improved accuracy over traditional systems. Improved signal to noise ratio can be achieved compared to traditional systems, and the total distance of laser measurement can be expanded.

The methods and systems of the present disclosure, as described above and shown in the drawings, provide for phasing light pulses with detectors with superior properties including improved range and signal to noise ratio, as well as new functionalities relative to traditional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a laser pulse emitter;
   a laser pulse detector; and a single controller connected to the laser pulse emitter and to the laser pulse detector to control timing of a laser pulse emitted from the laser pulse emitter and corresponding timing of opening the laser pulse detector for detection of a return of the laser pulse; and machine readable instructions configured to cause the controller to:

issue a command to a laser pulse emitter to emit a laser pulse;

issue a command to a laser pulse detector to open for detection of the laser pulse;

detect the laser pulse and determine total time of travel for the laser pulse; and calculate a distance measurement based on the time of travel of the laser pulse, wherein the instructions are configured to cause the contoller to delay issuing the command to open the laser pulse detector relative to when the laser pulse is emitted from the laser pulse emitter, wherein the controller commands the laser pulse emitter to emit multiple laser pulses, and wherein the controller issues corresponding commands to open the laser pulse detector for detection of the respective pulses each with a respective window of laser pulse detection, wherein the respective window for each laser pulse varies in duration over the multiple laser pulses, wherein the controller varies duration of the respective window of laser pulse detection on a pulse by pulse basis, and wherein the controller commands the laser pulse detector to open for multiple windows for a single pulse of the laser pulse emitter for measuring multiple ranges with a single laser pulse.

2. The imaging system as recited in claim 1, wherein the single controller includes a field programmable gate array (FPGA).

3. The imaging system as recited in claim 1, further comprising:

a scanner optically connected to the laser pulse emitter for scanning laser pulses over a field of regard; and a scanner optically connected to the laser pulse detector for detecting laser pulse returns from the field of regard.

4. The imaging system as recited in claim 1, further comprising:

optics optically connected to the laser pulse emitter for emitting the laser pulse as a conical flash over a field of regard; and at least one of optics or a scanner optically connected to the laser pulse detector for detecting laser pulse returns from the field of regard.

5. The imaging system as recited in claim 1, wherein the instructions are configured to cause the controller to tune timing of emitting the laser pulse from the laser emitter to match a window of time in which the laser pulse detector is open for detection of the laser pulse.

6. A method of laser distance measurement comprising:

issuing a command from a single controller to a laser pulse emitter to emit a laser pulse;

issuing a command from the single controller to a laser pulse detector to open for detection of a return of the laser pulse;

detecting the return of the laser pulse and determining total time of travel for the laser pulse; and calculating a distance measurement based on the time of travel of the laser pulse, wherein the controller delays issuing the command to open the laser pulse detector relative to when the laser pulse is emitted from the laser pulse emitter, wherein the controller commands the laser pulse emitter to emit multiple laser pulses, and wherein the controller issues corresponding commands to open the laser pulse detector for detection of the respective pulses each with a respective window of laser pulse detection, wherein the respective window for each laser pulse varies in duration over the multiple laser pulses, wherein the controller varies duration of the respective window of laser pulse detection on a pulse by pulse basis, and wherein the controller commands the laser pulse detector to open for multiple windows for a single pulse of the laser pulse emitter for measuring multiple ranges with a single laser pulse.

7. The method as recited in claim 6, wherein the controller tunes timing of emitting the laser pulse from the laser emitter to match a window of time in which the laser pulse detector is open for detection of the laser pulse.

8. The method as recited in claim 6, wherein the controller commands the laser pulse detector to open for laser pulse detection for a window with a shorter duration than time of flight for the laser pulse.

9. The method as recited in claim 6, further comprising controlling at least one of pulse duration and/or duration of window of opening the laser pulse detector to limit distance measurements to specific distances.

* * * * *